United States Patent
Liu et al.

(10) Patent No.: US 7,281,165 B2
(45) Date of Patent: Oct. 9, 2007

(54) SYSTEM AND METHOD FOR PERFORMING PRODUCT TESTS UTILIZING A SINGLE STORAGE DEVICE

(75) Inventors: Win-Harn Liu, Taipei (TW); Jeff Song, Taipei (TW); Yue Sun, Tianjin (CN)

(73) Assignee: Inventec Corporation, Taipei (TW)

( * ) Notice: Subject to any disclaimer, the term of this patent is extended or adjusted under 35 U.S.C. 154(b) by 579 days.

(21) Appl. No.: 10/459,453

(22) Filed: Jun. 12, 2003

(65) Prior Publication Data

US 2004/0255201 A1 Dec. 16, 2004

(51) Int. Cl.
*G06F 11/00* (2006.01)

(52) U.S. Cl. .......................... 714/37; 702/108

(58) Field of Classification Search ................ 702/108; 714/37
See application file for complete search history.

(56) References Cited

U.S. PATENT DOCUMENTS

| | | | | |
|---|---|---|---|---|
| 5,371,883 A * | 12/1994 | Gross et al. | ................... | 714/38 |
| 5,659,554 A * | 8/1997 | Okayasu | ..................... | 714/738 |
| 5,734,898 A * | 3/1998 | He | .............................. | 707/203 |
| 5,854,889 A * | 12/1998 | Liese et al. | ..................... | 714/43 |
| 5,857,192 A * | 1/1999 | Fitting | ......................... | 707/200 |
| 6,029,257 A * | 2/2000 | Palmer | ......................... | 714/40 |
| 6,182,245 B1 * | 1/2001 | Akin et al. | ..................... | 714/38 |
| 6,510,402 B1 * | 1/2003 | Logan et al. | ............... | 702/186 |
| 6,665,626 B2 * | 12/2003 | Hsieh et al. | ................. | 702/108 |
| 6,715,108 B1 * | 3/2004 | Badger et al. | ................. | 714/38 |
| 6,792,373 B2 * | 9/2004 | Tabor | ......................... | 702/108 |
| 6,807,506 B2 * | 10/2004 | Sutton et al. | ............... | 702/123 |
| 6,993,747 B1 * | 1/2006 | Friedman | ..................... | 717/124 |
| 2001/0030749 A1 * | 10/2001 | Ho et al. | ..................... | 356/430 |
| 2001/0053961 A1 * | 12/2001 | Liu et al. | ..................... | 702/123 |
| 2002/0128793 A1 * | 9/2002 | Hornberger et al. | ........ | 702/108 |
| 2002/0162059 A1 * | 10/2002 | McNeely et al. | ........... | 714/703 |
| 2003/0051188 A1 * | 3/2003 | Patil | .............................. | 714/4 |
| 2005/0021274 A1 * | 1/2005 | Eden et al. | ................. | 702/121 |

* cited by examiner

*Primary Examiner*—Bryce P. Bonzo
(74) *Attorney, Agent, or Firm*—Birch, Stewart, Kolasch & Birch, LLP

(57) ABSTRACT

A test system and method utilizing a single storage device through a network, which includes a server and at least a test object connected to a storage device that supports multi-system operations. The storage device provides many kinds of test environments and test tools for different test objects. The storage device includes a test program, a plurality of virtual test sections and test tools. When a correspondent virtual test section does not exist in the storage device, the associated test disk image is obtained from the server for establishing a new virtual test section in the storage device. Through the network operation, the test environment management is simplified and the test efficiency is improved.

4 Claims, 2 Drawing Sheets

SYSTEM AND METHOD FOR PERFORMING PRODUCT TESTS UTILIZING A SINGLE STORAGE DEVICE

BACKGROUND OF THE INVENTION

1. Field of the Invention

The invention generally relates to a testing system and method, and particularly relates to a system and method for testing information processing devices by utilizing a single storage device.

2. Related Art

Under the violent competitions of current markets, the quality of products is the most frequent demand being requested by people. The "Quality" is not only asked for the product itself, but is also asked for the design, manufacture, selling and service, and even a total quality of the image of the enterprise. Many enterprises have noticed that so as to promise and practice the quality improving actions for obtaining customer's satisfaction.

Recently, triple-C (computer, communication and consumer electronics) industry is a trend of technology integrations. Quality of the products has to be strictly monitored in order to prevent the products from defects. Tests for the finished products or assemblies are very important processes in the quality system. The tests reflect the quality of outgoing products, and also reflect the quality of manufacturing process. To test a computer, for example, a hard disk with operation system and associated driving programs and test tools have to be installed one after another before performing the tests.

The aforesaid hard disk, driving programs and test tools have to be prepared according to different models of the test objects. Moreover, as driving programs and test tools are being updated frequently, the disk and the data have to be updated accordingly that makes the maintenance of test system and device more bothersome. Also, a hard disk usually has a storage capacity of gigabytes, while the test programs and the data occupy only 200 or 300 megabytes that much wastes the space of the disk.

SUMMARY OF THE INVENTION

In order to solve the aforesaid problems, the object of the invention is to provide a test system and method utilizing a single storage device through a network. A server and at least a test object are connected via a network to a storage device that supports multi-system operations. The test system utilizes the single storage device to provide many kinds of test environments and test tools. Even when a test environment or test tool does not exist in the storage device, the associated test disk image can be obtained from the server for establishing a new virtual test section in the storage device. Through the network operation,the test environment management is simplified and the test efficiency is improved.

A test system utilizing a single storage device according to the invention includes a test object, a server, a network and a multi-system supported storage device. The test object is connected to the storage device. (The test object is the storage device which connected the test object with the test computer and supported the multi-system operation.) The storage device is further connected through the network to the server. The server includes the newly updated test tools for each models and test disk images required for establishing a new virtual test section. The multi-system storage device is composed of test programs, a plurality of virtual test sections and test tools. Each virtual test section includes the test environment and test parameters for testing a specific model of test object. Normally, the main booting region of the storage device does not include the records of the virtual test sections. The test sections are used only when a specific virtual test section is chosen according to the test object. The virtual test sections are accordingly established and updated as the tests for new models are made. The test program chooses test tools stored in the storage device that correspondent to the specific test object. The test tools and the virtual test sections are stored separately in the storage device, and are updated or downloaded by the server through the network.

When a virtual test section for the specific test object is not available on the storage device, a new virtual test section has to be established. The process is to link the storage device with the server automatically and to download a test disk image. The test disk image is then restored to form a virtual test section for the test object. The new virtual test section is stored for future tests. Through the installation and update of the multi-system storage device, adequate virtual test sections for different models of test objects are equipped on the storage device.

By using a multi-system storage device, the invention also provides a test method for testing objects. The processes are: performing a program to identifying the model of the test object; searching a correspondent virtual test section in the storage device; activating the virtual test section and forming a test environment of the test object; checking if the test disk image and test tools have to be updated; and providing selections for starting the test or quitting.

When a virtual test section correspondent to the test object does not exist in the storage device, a new virtual test section will be first located on the storage device. Then, searching through the network to get a new version test disk image, downloading and restoring the latest test disk image in the virtual test section. Also, when a test disk image or test tools have to be updated, they will be downloaded and updated through the network too.

Further scope of the applicability of the present invention will become apparent from the detailed description given hereinafter. However, it should be understood that the detailed description and specific example, while indicating preferred embodiments of the invention, are given by way of illustraion only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawing, which are given by way of illustration only, and thus are not limitative of the present invention, wherein.

DETAILED DESCRIPTION OF THE INVENTION

The invention provides a test system and method utilizing a single storage device through a network. A server and at least a test object are connected to a storage device that supports multi-system operations. The test system utilizes the single storage device to provide many kinds of test environments and test tools. Even when a test environment or test tool is not existed in the storage device, the associated test disk image can be obtained from the server for establishing a new virtual test section in the storage device.

Figure 1:
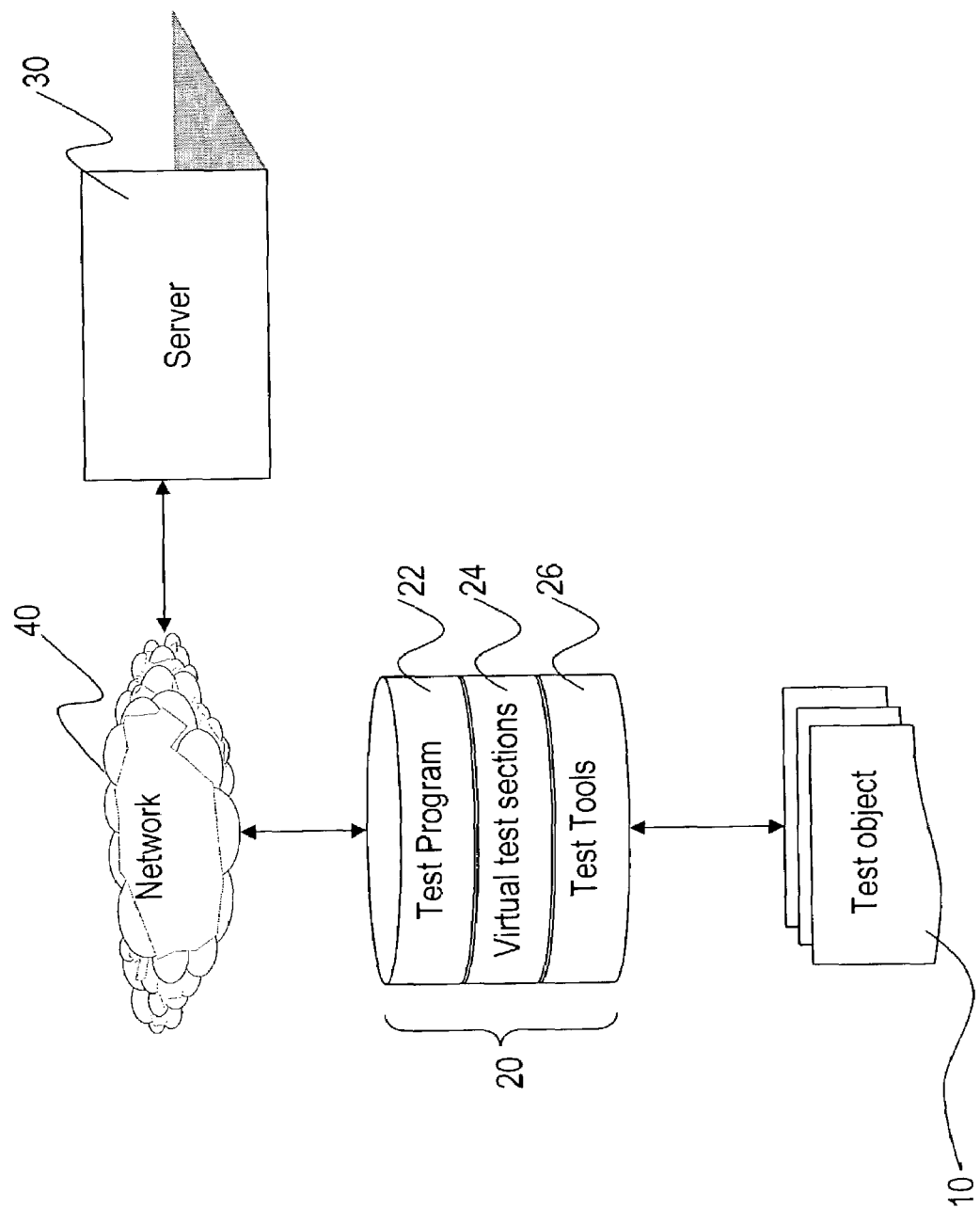
FIG. 1 is a systematic diagram of a multi-system supported testing system of the invention.

As shown in FIG. 1, a testing system utilizing a single storage device according to the invention includes a storage device 20, a test object terminal for connecting at least a test object 10, a network 40 and a server 30. The test object 10 is connected to the storage device 20. The storage device 20 is connected to the server 30 through the network 40. The server 30 includes test tools for different models of test objects and test disk images for establishing new virtual test sections. A test disk image is a full mapping file of a testing operation system of a certain model of test object. It prevents the bothersome installation of testing system software before the test. The user can just restore a test disk image in a virtual test section, and activate the virtual test section to form a certain test environment of the test object. The test disk images are maintained and managed by the server 30.

As shown in FIG. 1, the storage device 20 includes a test program 22, a plurality of virtual test sections 24 and test tools 26 correspondent to different models of test objects 10. The test program is executed to identify the model of the test object, searching the correspondent virtual test section 24 in the storage device 20 and choosing the correspondent test tools 26. Each virtual test section 24 includes the test environment and test parameters for testing a specific model of test object 10. Normally, the main booting region of the storage device 20 does not include the records of the virtual test sections 24. The test sections 24 are used only when a specific virtual test section is chosen according to the test object 10. The virtual test sections 24 are accordingly established and updated as the tests for new models are made. The test program 22 chooses test tools stored in the storage device 20 that correspondent to the specific test object 10. The test tools 26 and the virtual test sections 24 are stored separately in the storage device 20, and are updated by the server 30 through the network 24.

Figure 2:
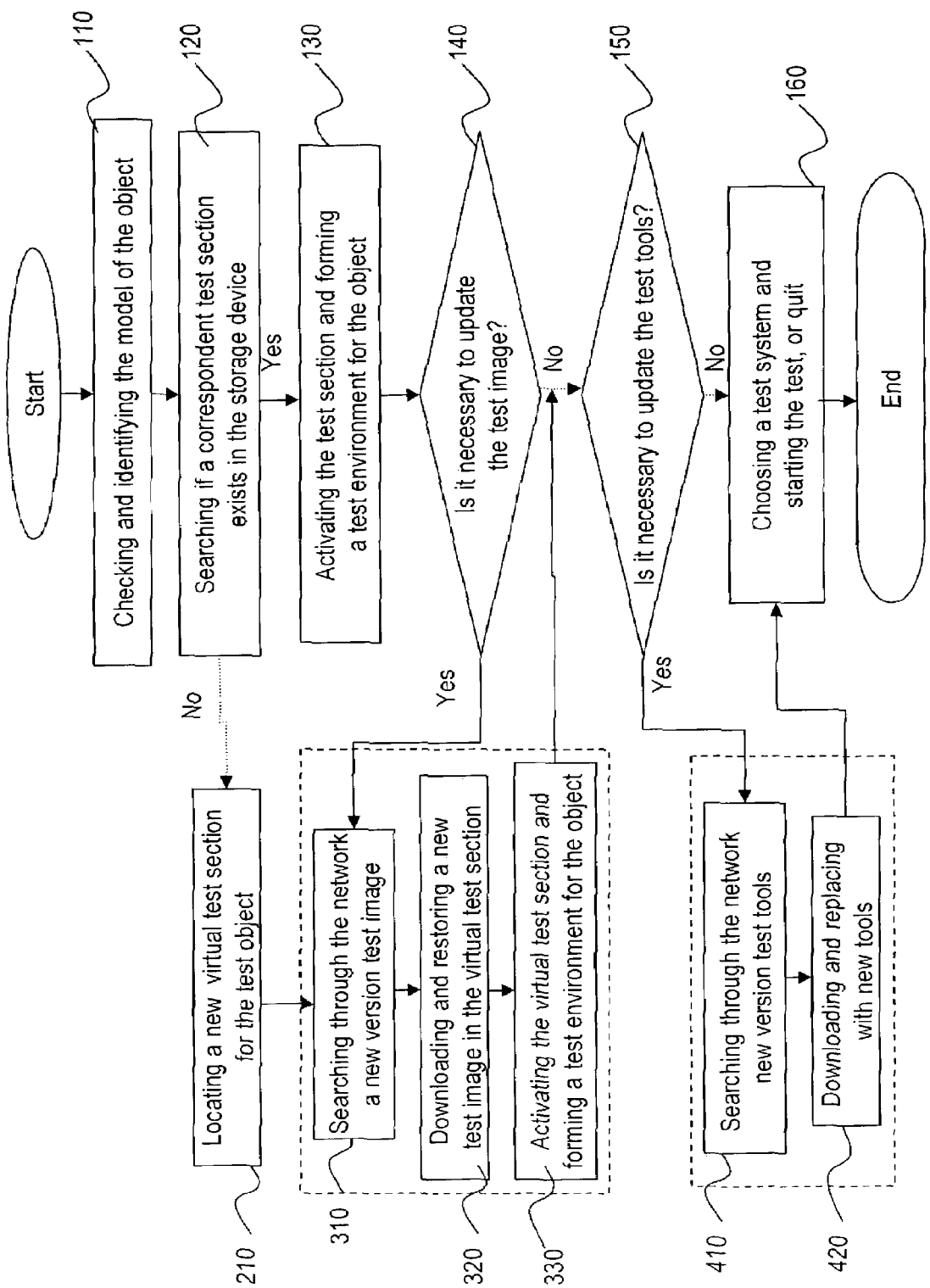
FIG. 2 is a flow chart of a testing method according to the invention.

The testing method utilizing a single storage device according to the invention is illustrated in FIG. 2. First, executing the test program and identifying the model of the test object (step 110). Then, searching if a correspondent test section exists in the storage device (step 120). When the test section exists, activating the test section and forming a test environment for the object (step 130). Then, checking if it is necessary to update the test disk image (step 140), if it is not necessary, then further checking if it is necessary to update the test tools (step 150). If it is not necessary, then providing selections for choosing a test system and starting the test or quitting (step 160).

In the aforesaid step 120 of searching if a correspondent test section exists in the storage device, when the test section does not exists, then locating a new virtual test section for the test object (step 210) and proceeding with step 310. Also, in the aforesaid step 140 of checking if it is necessary to update the test disk image, when it is necessary, searching through the network a new version of test disk image (step 310), downloading and restoring a new disk image in the virtual test section (step 320), activating the virtual test section and forming a test environment for the test object (step 330) and proceeding with step 150. In the step 150 of checking if it is necessary to update the test tools, when it is necessary, searching through the network the new version test tools (step 410), downloading and replacing with new test tools (step 420) and proceeding with step 160.

In conclusion, the invention utilizes a single storage device, programmed to establish, update and activate a specific virtual test section from a plurality of virtual test sections, to form a testing system. The multiple virtual test sections fully utilize the space of the storage device. The test tools and the virtual test sections are stored separately so as to prevent frequent update of the test tools or the test disc image. Only some test tools or test parameters have to be downloaded from the server, instead of frequent downloading and update of test disk images. Furthermore, the virtual test sections are departed physically in the storage device that the single storage device can support multiple partitions, such as FAT16, FAT32 and NTFS formats, and several operation systems, so as to support tests for different models.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A testing system, utilizing a single storage device, and supporting different systems of test objects, comprising:
   a storage device, comprising:
   a test program for identifying the model of a test object and searching a virtual test section correspondent to said model;
   a plurality of virtual test sections, each comprising specific test environment and parameters for testing a model of test object, and activated individually only when being needed; and
   a plurality of test tools for performing tests for any individual test object;
   a test object terminal, for connecting said test object to said storage device, and providing test environment and test commands from said storage device to said test object;
   a server, comprising newly updated testing tools and test disk images for establishing new virtual test sections; and
   a network, connecting said storage device and said server, for downloading said newly updated test tools and test disk images.

2. A testing system utilizing a single storage device according to claim 1 wherein a new virtual test section is established by downloading from said server when a correspondent virtual test section for said test object does not exist in said storage device.

3. A testing system utilizing a single storage device according to claim 2 wherein said new virtual test sections is restored by a test disk image downloaded by said storage device from said server, and stored for uses in future tests.

4. A testing system utilizing a single storage device according to claim 1 wherein said virtual test section established and updated as tests for new models are made.

* * * * *